United States Patent [19]
vanderSanden

[11] Patent Number: 5,731,013
[45] Date of Patent: Mar. 24, 1998

[54] RECONFIGURABLE MOLD HAVING TRAVELLING SEPARATOR ASSIST

[75] Inventor: Louis vanderSanden, Hertogenbosch, Netherlands

[73] Assignee: The Whitaker Corporation, Wilmington, Del.

[21] Appl. No.: 708,067

[22] Filed: Aug. 16, 1996

Related U.S. Application Data

[60] Provisional application No. 60/005,512 Sep. 13, 1995.

[51] Int. Cl.$^6$ .................................................. B29C 45/40
[52] U.S. Cl. .......................... 425/183; 425/185; 425/190; 425/556; 425/575
[58] Field of Search ............................. 425/183, 185, 425/190, 556, 575

[56] References Cited

U.S. PATENT DOCUMENTS

| | | | |
|---|---|---|---|
| 3,756,553 | 9/1973 | Ranz | 249/142 |
| 3,807,928 | 4/1974 | Horberg, Jr. et al. | 425/387 B |
| 3,898,030 | 8/1975 | Bishop | 425/183 |
| 4,303,221 | 12/1981 | Galluser, et al. | 249/102 |
| 4,330,248 | 5/1982 | Platte | 425/183 |
| 4,379,685 | 4/1983 | Tada et al. | 425/183 |
| 4,416,604 | 11/1983 | Bender et al. | 425/183 |
| 4,439,123 | 3/1984 | Sano et al. | 425/183 |
| 4,501,548 | 2/1985 | Jahnel | 425/183 |
| 4,550,006 | 10/1985 | Laghi | 425/183 |
| 4,815,960 | 3/1989 | Rudolph | 425/522 |
| 4,861,534 | 8/1989 | Boehm et al. | 264/102 |
| 5,246,362 | 9/1993 | Kobayashi et al. | 425/183 |
| 5,255,889 | 10/1993 | Collette et al. | 249/102 |
| 5,282,733 | 2/1994 | Noritake et al. | 425/183 |
| 5,445,511 | 8/1995 | Ito et al. | 425/183 |
| 5,456,588 | 10/1995 | Yonekubo et al. | 425/183 |
| 5,560,939 | 10/1996 | Nakagawa et al. | 425/183 |

FOREIGN PATENT DOCUMENTS

| | | |
|---|---|---|
| 098022 | 1/1984 | European Pat. Off. |
| 63 062 332 | 3/1988 | Japan. |
| 60 15 685 | 1/1994 | Japan. |
| 2189182 | 10/1987 | United Kingdom. |
| 2 233 596 | 1/1991 | United Kingdom. |

OTHER PUBLICATIONS

Patent Abstracts of Japan, vol. 18, No. 220 (M-1595), 20 Apr. 1994 & JP,A, 06 015685 (Japan Steel Works Ltd), 25 Jan. 1994.

*Primary Examiner*—James P. Mackey
*Attorney, Agent, or Firm*—Bradley N. Ditty

[57] ABSTRACT

A reconfigurable injection mold machine (10) is disclosed having movable mold bodies (62, 62' and 64, 64') that can be automatically repositioned with respect to each other to mate different mold cavities for molding different parts. The machine includes a stationary A-side frame (14) having an A-side mold assembly (18) attached thereto and a movable B-side frame (16) having a B-side mold assembly (20) attached thereto. Each mold assembly includes a first mold body (60, 60') attached thereto and third and second mold bodies (62, 62' and 64, 64') that are coupled thereto and arranged for movement and repositioning with respect to the first mold body (60, 60'). The third and second movable mold bodies (62, 62' and 64, 64') include a traveling separator assist (150) arranged in the A-side portion of the movable mold body (64) that moves along therewith. The traveling separator assist (150) is operable to eject the molded part from the A-side portion mold cavity (104) during movement of the movable frame (16) to the open position so that the molded part remains in the B-side portion mold cavity (104'). The traveling separator assist (150) is operational in all operating positions of the mold bodies.

13 Claims, 10 Drawing Sheets

Fig. 3 (A-SIDE FRONT MOLD)

(B-SIDE BACK MOLD)

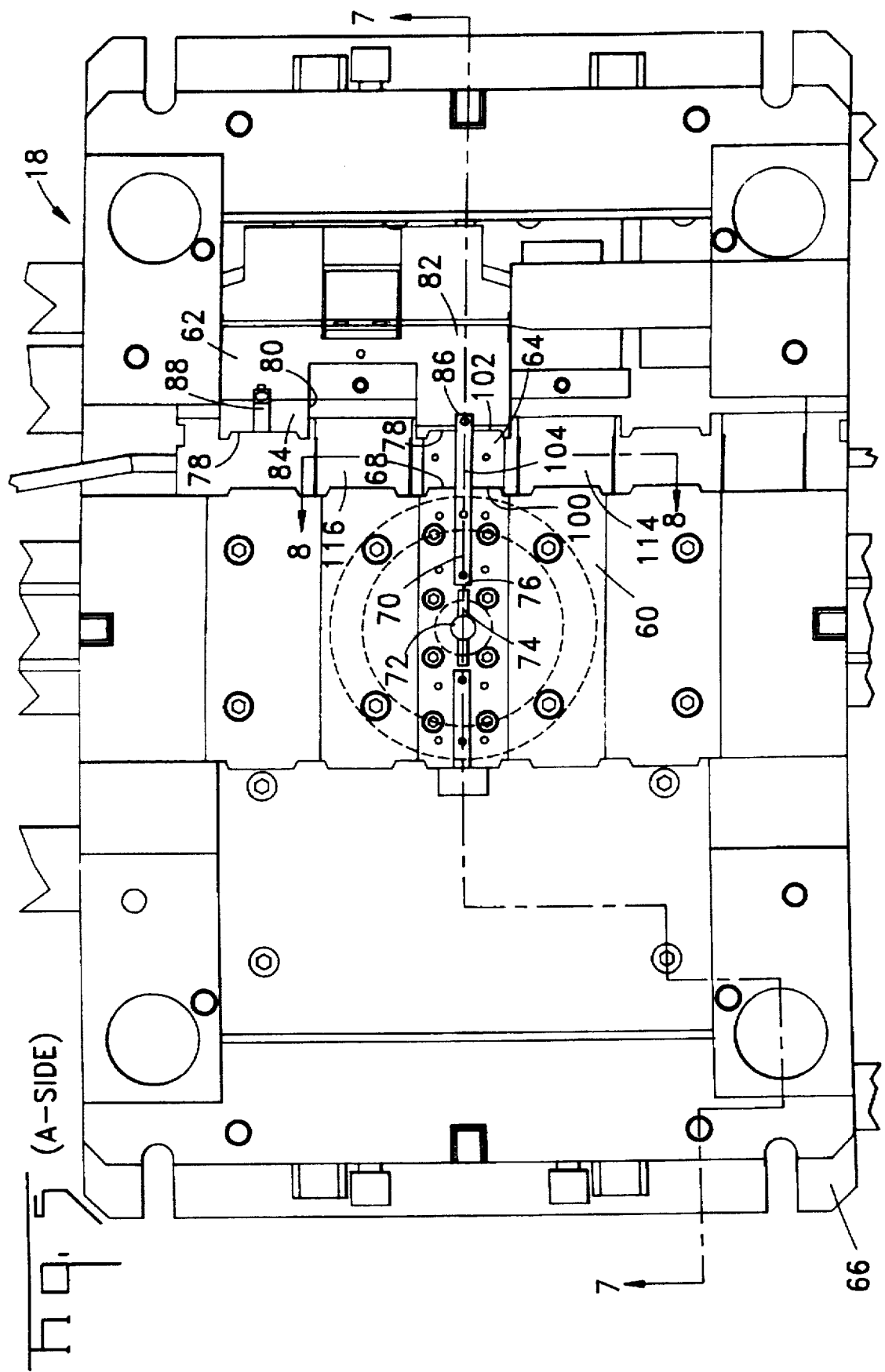

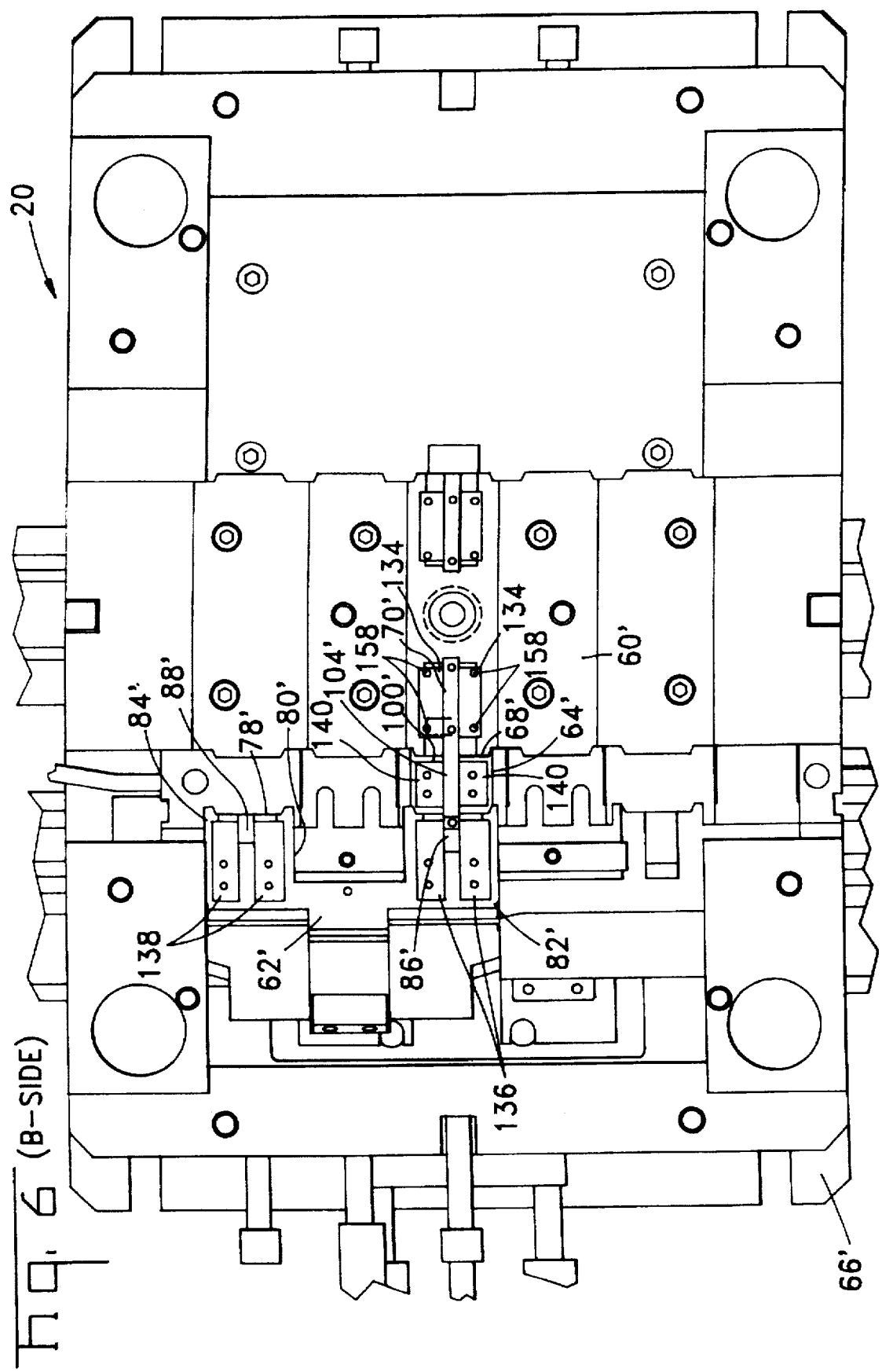

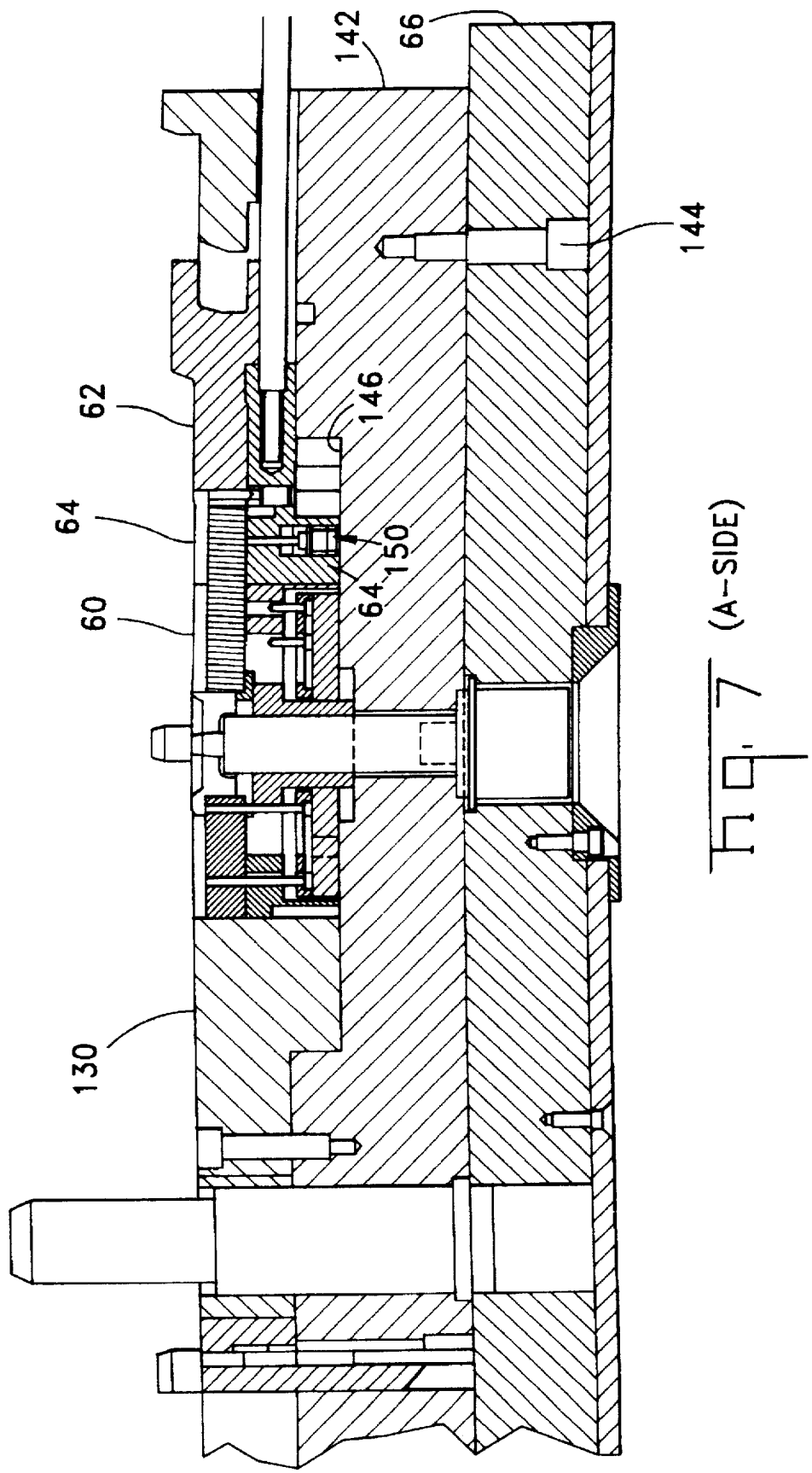
Fig. 7 (A-SIDE)

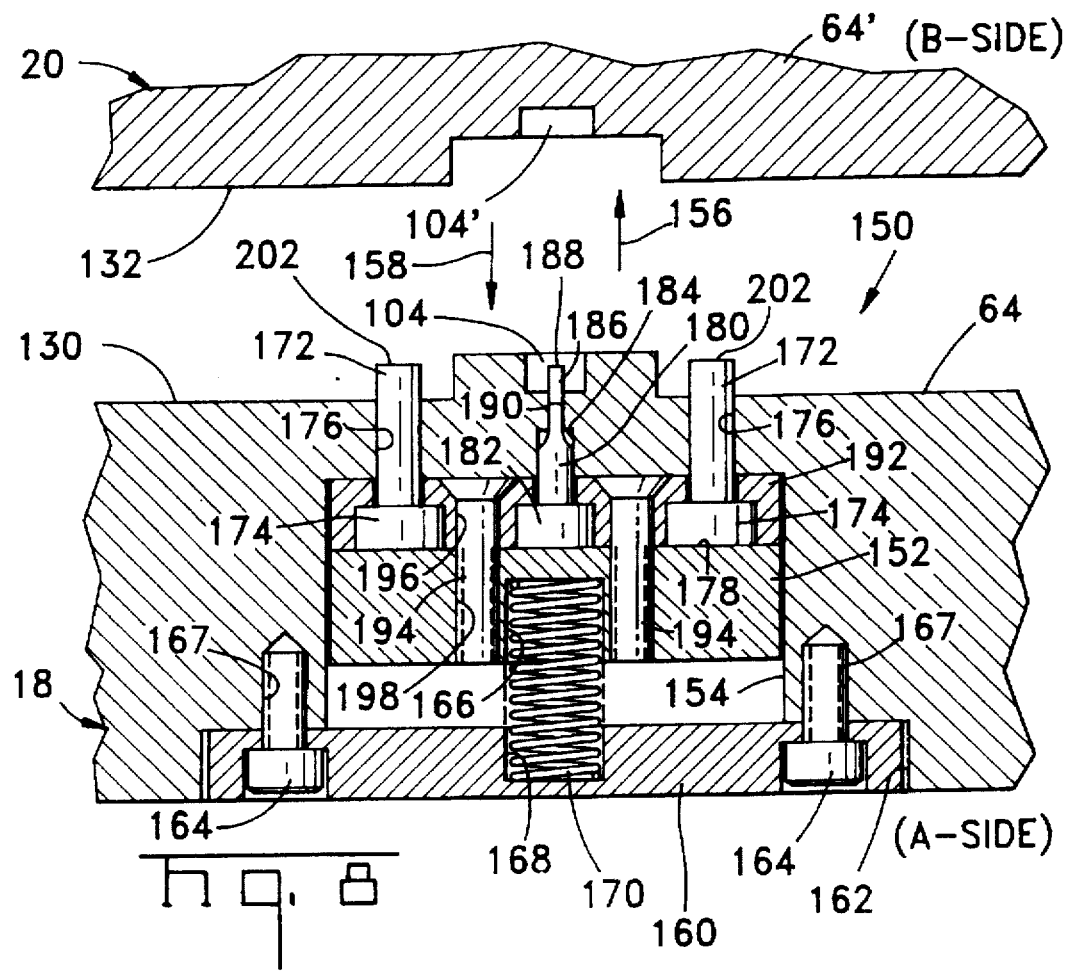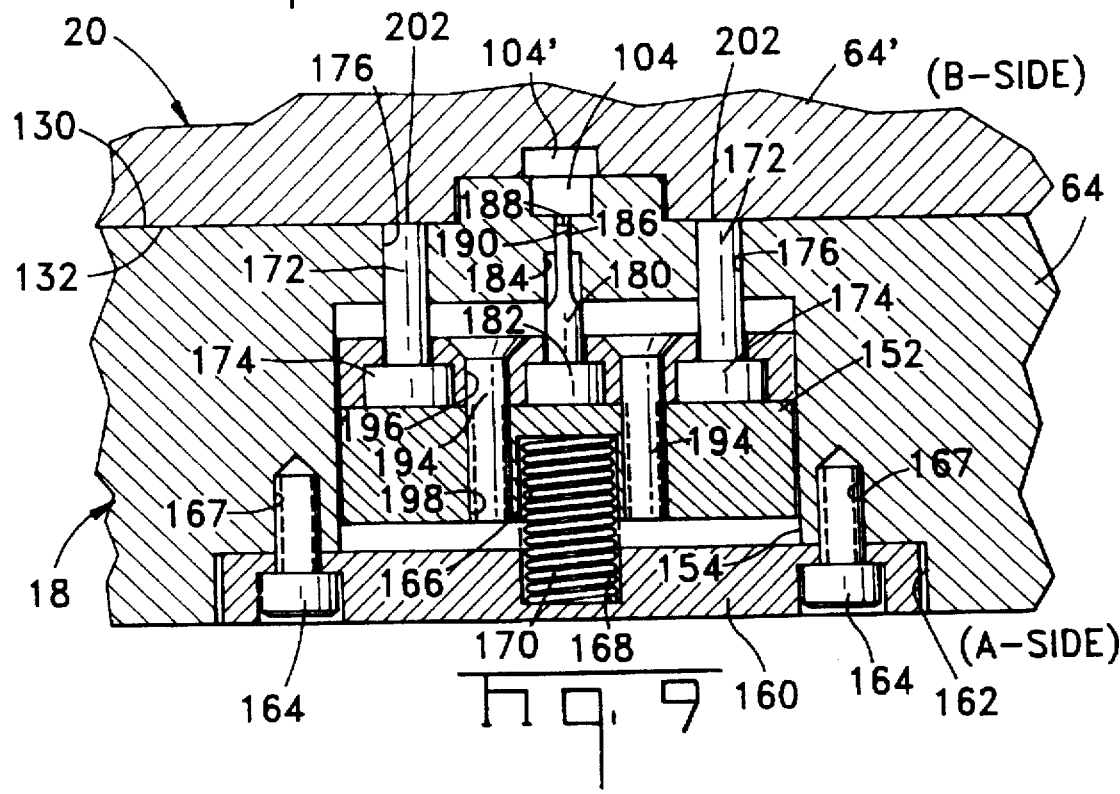

RECONFIGURABLE MOLD HAVING TRAVELLING SEPARATOR ASSIST

This is application claims the benefit of U.S. provisional application No. 60/005,512, filed Sep. 13, 1995.

The present invention relates to injection molding apparatus for molding parts wherein the apparatus is reconfigurable by moving one portion of the mold with respect to a fixed portion to mold one of several different parts, and more particularly to such apparatus having a separator assist that travels along with the portion of the mold that moves and, during opening of the mold, operates to assure that the molded part remains in the desired side.

BACKGROUND OF THE INVENTION

Molds for making injected molded parts are typically utilized in relatively high production environments where thousands of parts are molded in quick succession. These molds frequently are in continuous operation for days or weeks making the same part. When it is desirable to make a different part the mold is removed from the mold machine and replaced with a different mold. This, of course, means that the mold machine must be taken out of production while the molds are being changed. This usually does not cause an economic hardship because of the very large numbers of parts that are produced during the relatively long production cycle. The relatively short down time to change the molds is tolerable. However, when shorter production cycles are required because a smaller number of different parts is needed, the production down time needed for changing molds becomes more significant resulting in a greatly increased economic liability.

Reconfigurable molds are known that can be manipulated to mold different parts. These molds usually require that the mold be disassembled and mold sections either be added or subtracted. This, of course, requires that the mold machine be taken out of production while the mold is reconfigured. An example of this type of reconfigurable mold is disclosed in U.S. Pat. No. 5,255,889 which issued Oct. 26, 1993 to Collette et al. The '889 patent discloses a blow mold for making a beverage bottle, having upper and lower mold sections that are joined by various intermediate sections that can be added or removed from the middle to mold the desired size bottle. While some of the same mold parts are common to all parts that are molded, the reconfiguring process consumes a significant amount of time resulting in slowed production. As with most mold machines, after shutdown of the machine to reconfigure the mold, the machine must be purged of old mold material. When the machine is again brought on line, the first several molded parts usually must be discarded until the process restabilizes. Another example of a reconfigurable mold is disclose in U.S. Pat. No. 4,861,534 which issued Aug. 29, 1989 to Boehm et al. This mold is for molding circuit boards and utilizes a single mold cavity with an array of core pins that are selectively retractable from the cavity. By allowing only the core pins that are required to produce the desired hole pattern in the circuit board to remain in the mold cavity and retracting all others, any desired hole pattern may be produced in the circuit board. However, when a circuit board of different size is required, the mold must be changed.

Reconfigurable molds having movable mold bodies that can be automatically positioned to mold a particular part will require substantially no down time and will overcome many of the detriments of the prior art reconfigurable molds, as set forth above. However, when separator assist elements are required to assure that the molded part separates from one side of the mold when the mold is opened, such as when molding small complex electrical connector housings, it is difficult to provide the needed separator assist elements in the movable mold bodies.

What is needed is a reconfigurable mold having movable mold bodies that can be easily and automatically repositioned to make relatively small quantities of different parts while providing a separator assist mechanism that is operable in all molding positions of the movable mold bodies.

SUMMARY OF THE INVENTION

Molding apparatus is disclosed for selectively molding one of a plurality of different molded parts. The molding apparatus includes a mold frame, an A-side frame and a B-side frame, both of which are coupled to the mold frame. First and second mold bodies are provided, the first mold body having a first mold cavity therein and the second mold body having a second mold cavity therein. The second mold body is selectably movable with respect to the first mold body to a first position where the second mold cavity is in communication with the first mold cavity and to a second position where the second mold cavity is spaced from the first mold cavity. Both the first and second mold bodies are split along a part line so that each has a portion on one side of the part line coupled to the A-side frame and another portion on the other side of the part line coupled to the B-side frame. One of the A-side frame and B-side frame is a movable frame arranged to move in a direction toward the part line into a closed position wherein respective portions of the first and second mold bodies are in mutual mated engagement, and in an opposite direction away from the part line to an open position wherein the respective portions are separated. A traveling separator assist is arranged in the A-side portion of the second mold body and operable to eject the molded part from the second mold cavity in the A-side portion during movement of the movable frame to the open position. The traveling separator assist includes a spring mechanism for effecting operation thereof when the second mold body is in both the first and second positions, so that the molded part remains in the B-side portion when the mold is split.

DESCRIPTION OF THE FIGURES

FIG. 5 is an enlarged view of a portion of that of FIG. 3;

FIG. 6 is an enlarged view of a portion of that of FIG. 4;

FIG. 7 is a cross-sectional view taken along the lines 7—7 in FIG. 5;

FIGS. 8 and 9 are cross-sectional views taken along the lines 8—8 in FIG. 5 showing the traveling separator assist mechanism when the mold is open and closed, respectively;

DESCRIPTION OF THE PREFERRED EMBODIMENT

Figure 1:
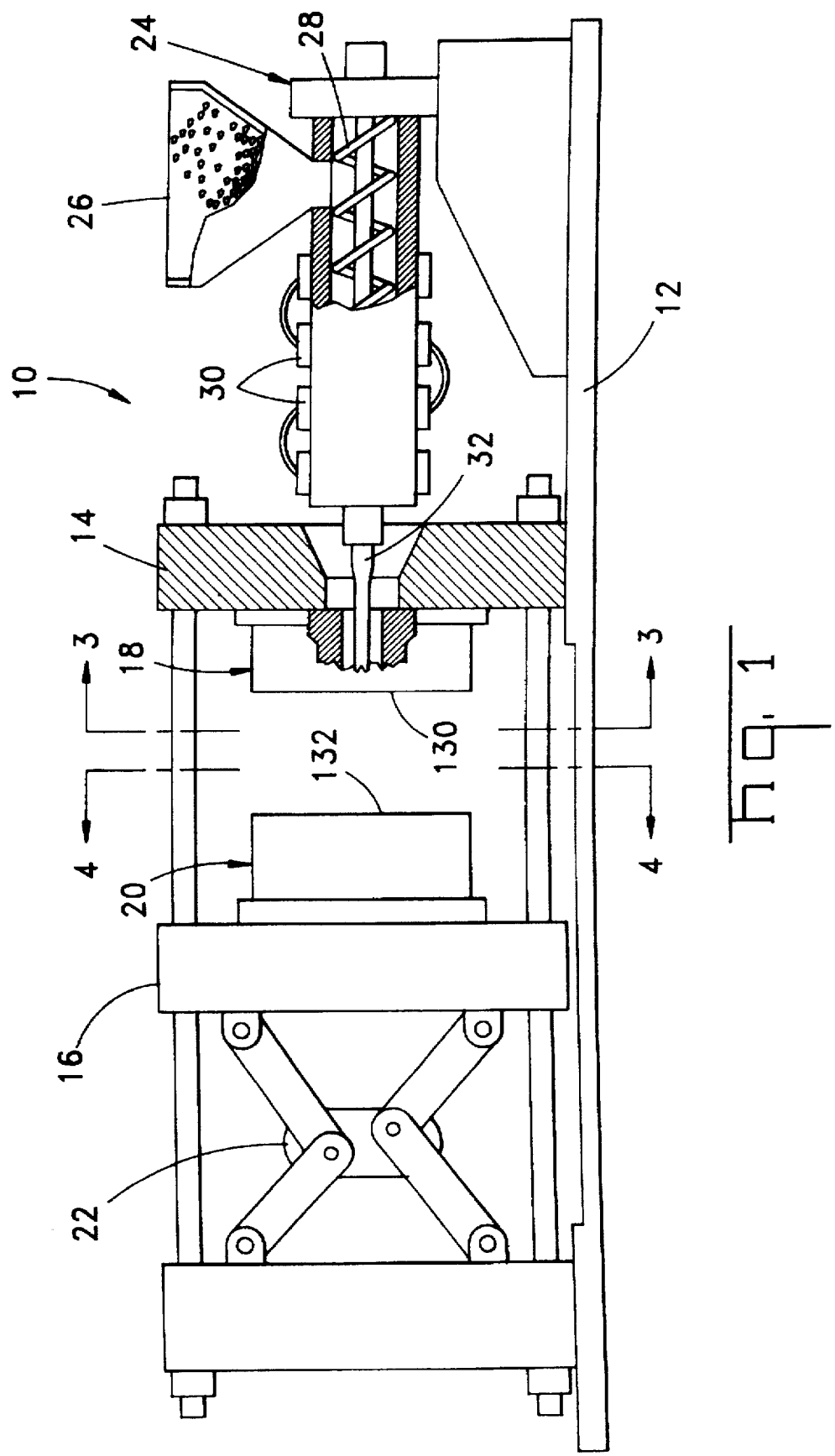
FIG. 1 is a front view of a mold machine incorporating the teachings of the present invention.

There is shown in FIG. 1 a mold machine 10 having a machine frame 12, an A-side frame 14 fixed to the machine frame, and a B-side frame 16 that is coupled to the machine frame so that it can move toward and away from the A-side frame. An A-side mold assembly 18 is attached to the A-side frame 14 and a mating B-side mold assembly 20 is attached to the B-side frame, in the usual manner. The B-side frame 16 is moved by means of a toggle clamp 22 that is hydraulic or electrical powered. A mold material injection system 24 is attached to the machine frame 12 and arranged to inject mold material into the mold cavities in the mated A-side and B-side mold assemblies, as will be explained below.

Figure 2:
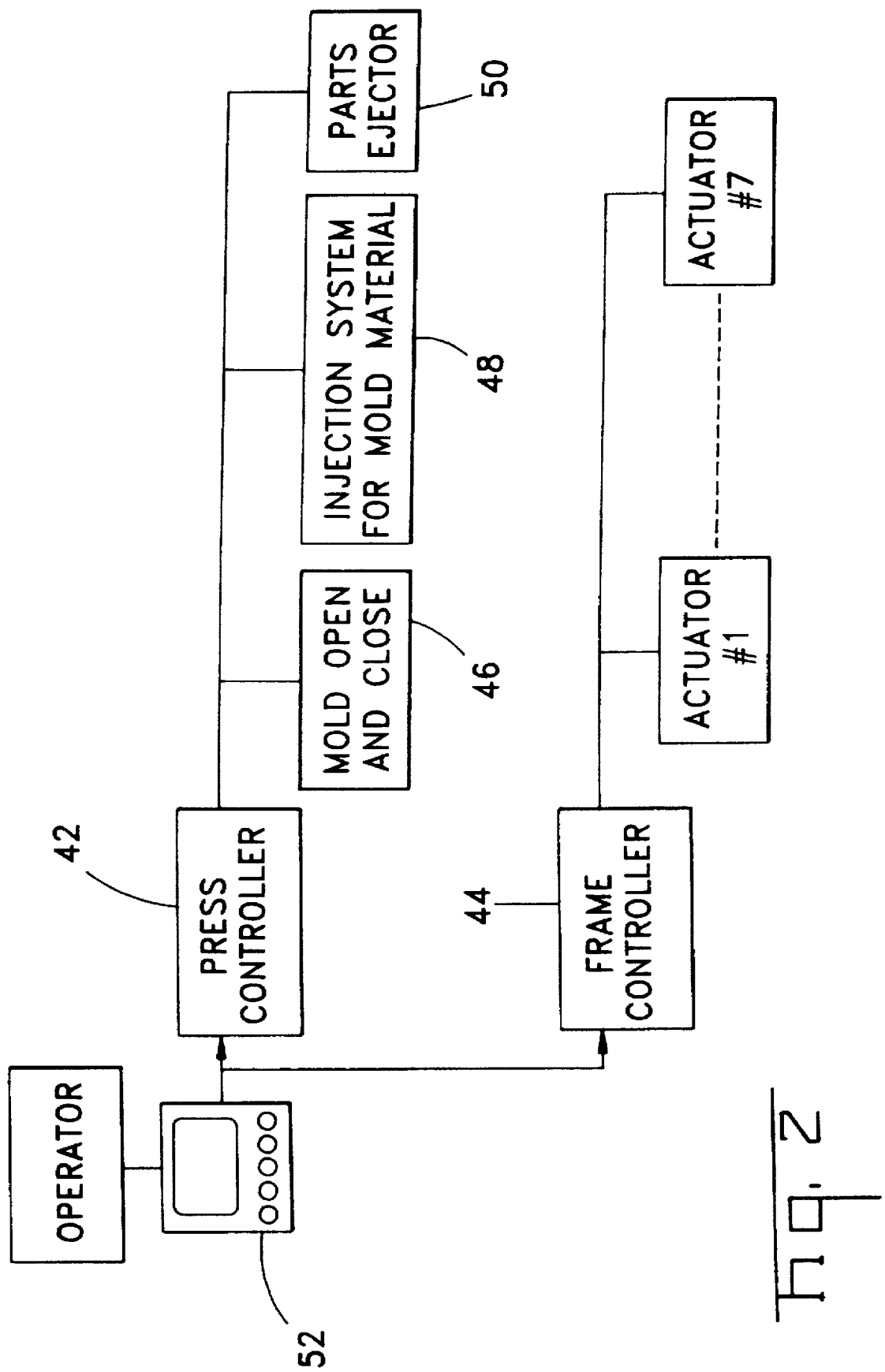
FIG. 2 is a block diagram showing control functions of the machine shown in FIG. 1.

The injection system 24 includes a hopper 26 for holding plastic pellets, a rotating screw 28 for feeding the pellets and the molten plastic, heater bands 30 for heating the plastic to a molten state, and a nozzle 32 that directs the molten plastic directly into the A-side mold assembly 18. A block diagram is shown in FIG. 2 showing the control functions of the mold machine 10. A press controller 42 and a frame controller 44 are interconnected to the machine 10. The press controller 42 controls various standard press functions such as opening and closing the mold, commanding the mold material injection system, and ejection of the finished molded parts, indicated in FIG. 2 as 46, 48, and 50, respectively. The frame controller 44 is interconnected to both the A-side and B-side mold assemblies 18 and 20, respectively, and controls movement of the movable mold bodies when reconfiguring the mold, as will be explained below. An input/output terminal 52 is optionally interconnected with the press and frame controllers 42 and 44 so that an operator can manually enter mold configuration commands.

Figure 3:
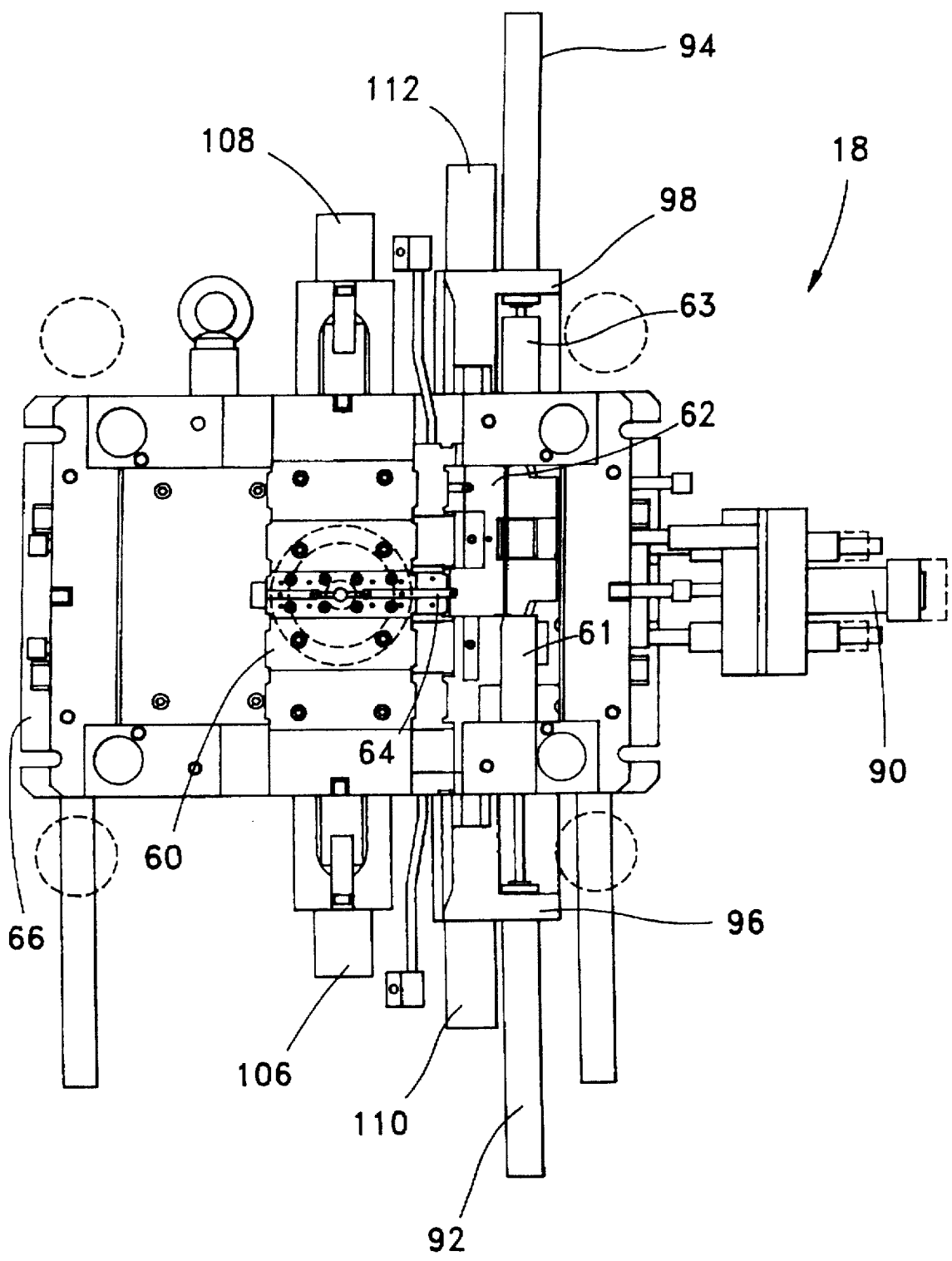
FIG. 3 is a cross-sectional view taken along the lines 3—3 in FIG. 1.

The A-side mold assembly 18, as shown in FIGS. 3 and 5, includes first, second and third mold bodies 60, 64, and 62, respectively. The first mold body 60 is rigidly attached to a platen 66 that serves as a base for the A-side mold assembly 18. The third and second mold bodies 62 and 64 are slidingly coupled to the platen 66, as will be explained. As best seen in FIG. 5, the first mold body 60 includes a first surface 68 and a first mold cavity 70 that intersects the surface 68. The nozzle 32 enters the center of the first mold body and terminates in a sprue 72 which is in communication with the mold cavity 70 by means of a runner 74 and tunnel gate 76, in the usual manner.

The third mold body 62 includes a second surface 78 that is parallel to the first surface 68 and opposed thereto, as shown in FIG. 5. A cutout 80 is formed in the second surface 78 thereby forming two legs 82 and 84. The leg 82 includes a second mold cavity 86 and the leg 84 includes a third mold cavity 88, each of which intersects the second surface 78. The third mold body 62 is slidingly coupled to the platen 66 by any suitable means so that it is free to move both horizontally and vertically, as viewed in FIGS. 3 and 5. A first linear actuator 90, which in the present example is an air cylinder, is attached to the platen 66 and is slidingly coupled to the third mold body 62 so that upon operation of the actuator 90, the third mold body is made to move in either direction along a horizontal path, as viewed in FIG. 3. A pair of opposing second and third linear actuators 92 and 94; which are air cylinders in the present example, are secured to mounting brackets 96 and 98 that are attached to the platen 66. The piston rods of the two actuators 92 and 94 are coupled to opposite sides of the third mold body 62 through two slide bars 61 and 63 which abut against the third mold body 62 so that the third mold body can be made to move in either direction along a vertical path, as viewed in FIG. 3.

The second mold body 64 includes third and fourth parallel surfaces 100 and 102, respectively. A fourth mold cavity 104 extends through the second mold body 64 intersecting the two surfaces 100 and 102. The second mold body 64 is slidingly coupled to the platen 66 by any suitable means so that it is free to move both horizontally and vertically, as viewed in FIGS. 3 and 5. Fourth and fifth linear actuators 106 and 108, which in the present example are air cylinders, are attached to the platen 66 and are coupled through a pivoting linkage, not shown, to the second mold body 64 so that upon operation of the actuators, the second mold body 64 is made to move toward the right, as viewed in FIG. 3, toward the first actuator 90. A pair of opposing sixth and seventh linear actuators 110 and 112, which are air cylinders in the present example, are secured to mounting brackets 96 and 98. The piston rods of the two actuators 110 and 112 are slidingly coupled to opposite sides of the second mold body 64 so that by varying the relative pressure in the two actuators, the second mold body can be made to move in either direction along a vertical path, as viewed in FIG. 3, and parallel to the first surface 68. The second mold body 64 includes two opening 114 and 116 that extend completely through the body 64 intersecting the third and fourth surfaces 100 and 102, for a purpose that will be explained.

Figure 4:
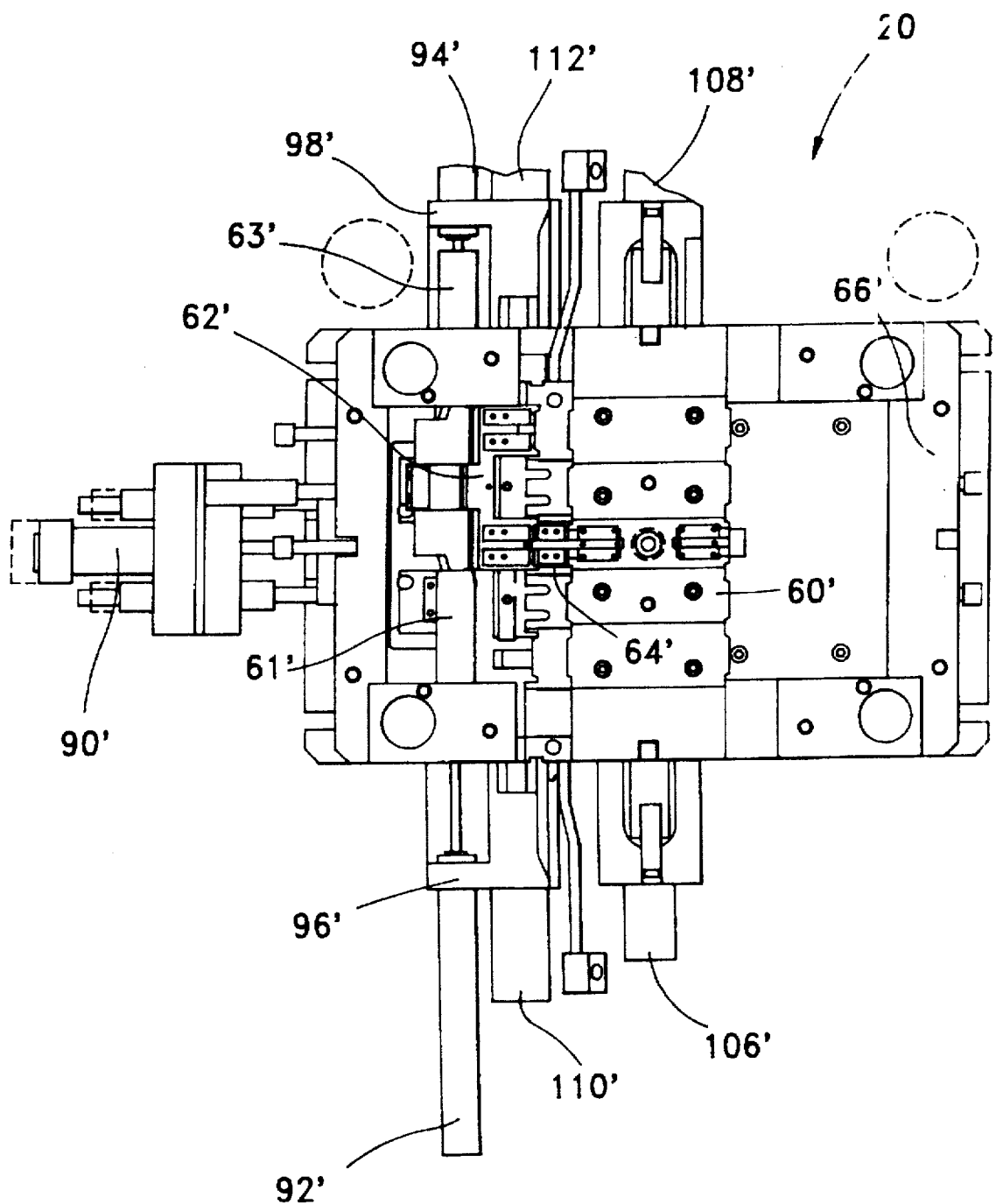
FIG. 4 is a cross-sectional view taken along the lines 4—4 in FIG. 1.

The B-side mold assembly 20, as viewed in FIGS. 4 and 7, have first, second and third mold bodies that mate with the first, second and third mold bodies 60, 64, and 62 of the A-side assembly 18, and have similar identifying part numbers that are primed. That is, the first, second and third mold bodies of the B-side are identified by the part numbers 60', 64', and 62', respectively. Additionally, other features of the B-side mold assembly that have substantially similar corresponding features on the A-side will be identified with a primed version of the A-side part number, even though the corresponding features may be somewhat different. The third and second mold bodies 62' and 64' are arranged to move both horizontally and vertically, as viewed in FIG. 4, in a manner similar to the mold bodies 62 and 64, by means of first, second, third, fourth, fifth, sixth, and seventh actuators 90', 92', 94', 106', 108', 110', and 112', respectively. The outer surfaces of the A-side mold bodies 60, 62, and 64 are mutually coplanar and are collectively identified by the number 130 in FIG. 1, this collective surface being the parting line of the mold. The opposing surfaces of the B-side mold bodies 60', 62', and 64' are also mutually coplanar and parallel with the surface 130 and are collectively identified by the number 132 in FIG. 1. The collective surfaces 130 and 132 form a part line and are in sealing mated engagement during the actual molding process, as will be explained.

Figure 10:
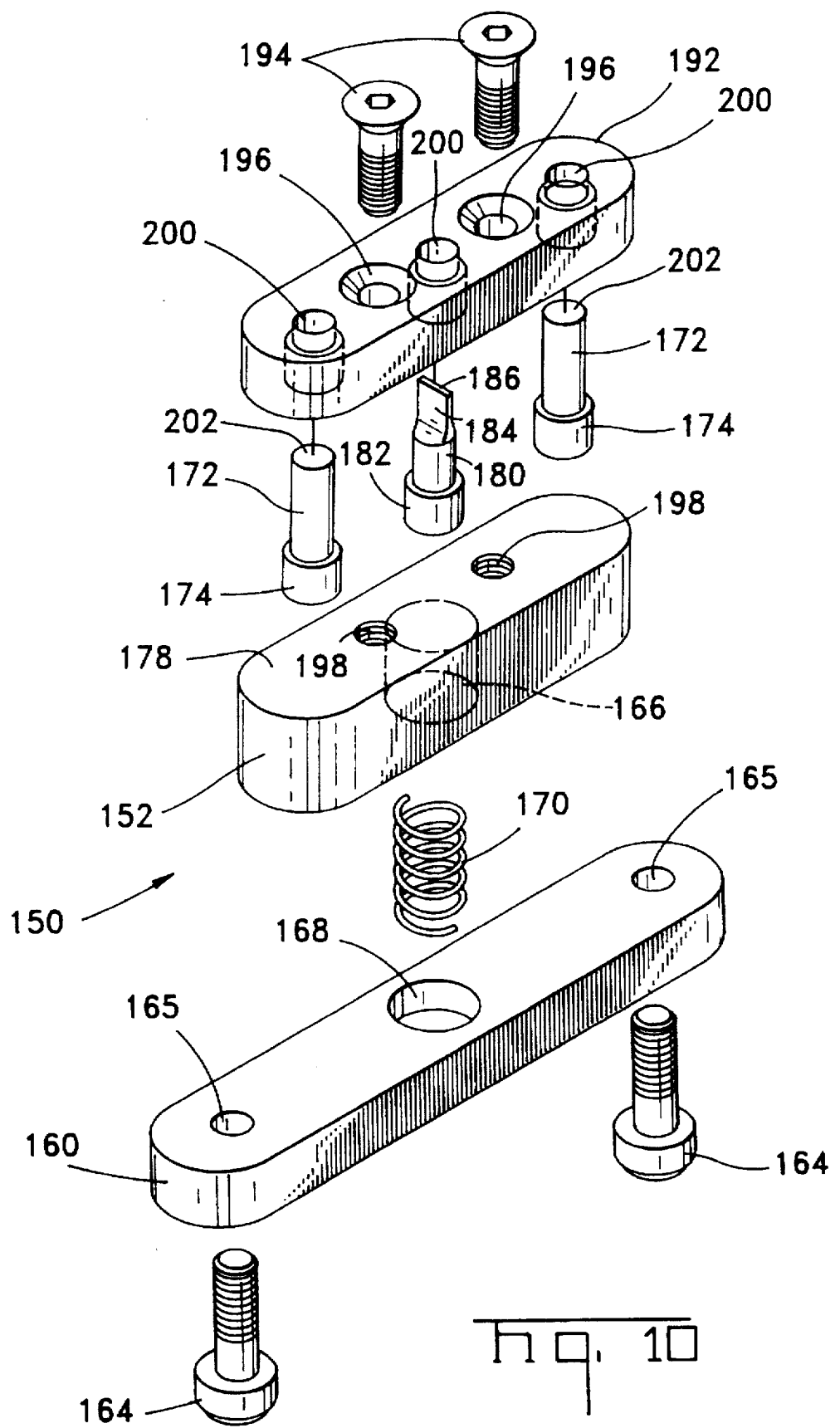
FIG. 10 is an exploded parts view of the traveling separator assist mechanism shown in FIG. 8.

As shown in FIG. 7, the A-side mold assembly includes a base plate 142 that is attached to the platen 66 by means of screws 144. The base plate 142 includes a recess 146 that contains and locates the first, second and third mold bodies 60, 64, and 62, respectively. A traveling separator assist 150 is positioned in an opening in the second mold body 64 for assuring that the molded part remains with the B-side mold cavity when the mold is opened. As best seen in FIGS. 8, 9, and 10, the traveling separator assist 150 includes a first elongated plate 152 arranged in an elongated opening 154 of similar shape formed in the A-side portion of the second mold body 64. The first elongated plate 152 is sized to slide freely within the opening 154 in a first direction indicated by the arrow 156 toward the B-side portion of the mold body 64', and in a second opposite direction indicated by the arrow 158. A second elongated plate 160 serves as a retaining plate for the traveling separator assist 150 and is positioned within a recess 162 formed in the bottom surface of the A-side portion of the second mold body 64. The second plate 160 is secured in place by means of screws 164 that extend through counterbored clearance holes 165 and are threaded into holes 167 in the second mold body 64. The first and second plates each have a blind hole 166 and 168, respectively, formed therein in opposed relationship, containing an extension spring 170. The spring 170 urges the first elongated plate 152 upwardly, as viewed in FIGS. 8 and 9, in the first direction 156. A pair of abutting pins 172 having enlarged heads 74 arranged in slip fit sliding engagement with two holes 176 formed in the A-side portion of the second mold body 64. The enlarged heads 174 of the two pins are against the upper surface 178 of the first elongated plate 152. An ejector member 180 having an enlarged head 182 is in slip fit sliding engagement with a hole 184 formed in the A-side portion of the second mold body 64. The ejector member 180 is disposed between the two abutting pins 172 with its enlarged head 182 against the upper surface 178, as shown in FIGS. 8 and 9. The end of the ejector member opposite the enlarged head 182 includes a flat narrow portion 186 formed thereon that terminates in an ejector edge 188. The flat narrow portion 186 is in slip fit sliding engagement with a rectangular opening 190 formed in second mold body 64 in alignment with the hole 184. A third plate or retaining plate 192 is attached to the first elongated plate 152 by means of two screws 194 that extend through holes 196 in the third plate and into threaded holes 198 in the first plate. Three counterbored holes 200 are formed through the third plate 192 in precise alignment with the holes 176 and 184 in the mold body 64 for receiving, with clearance, the two abutting pins 172 and the ejector member 180. The counterbores are facing the surface 178 of the first elongated plate 152 and are sized to receive the enlarged heads 174 of the two pins 172 and the enlarged head 182 of the ejector member 180, as best seen in FIGS. 8 and 9. This structure holds the two abutting pins 172 and the ejector member 180 captive to the first elongated plate 152.

During operation, as the B-side frame 16 is moved from the open position, shown in FIGS. 1 and 8 to the closed position, shown in FIG. 9, portions of the composite surface 132 engage the ends 202 of the two abutting pins 172 causing them to move downwardly in the second direction as indicated by the arrow 158 in FIG. 8. The enlarged heads 174 push against the surface 178 causing the first plate 152, attached retaining plate 192, and captive ejector member 180 to also move downwardly in the second direction against the urging of the spring 170. This movement continues until the B-side frame is in its closed position and the two composite surfaces 130 and 132 matingly engage, as shown in FIG. 9. In this position the ejector edge 188 is flush with the bottom of the fourth mold cavity 104. After the molding operation is complete, the toggle clamp 22 is actuated to open the mold by moving the B-side frame 16 toward its open position shown in FIG. 1. As the B-side frame begins to move the B-side mold assembly 20 withdraws away from the A-side mold assembly 18, allowing the spring 170 to urge the first elongated plate 152 upwardly, as viewed in FIGS. 8 and 9 so that the ejector edge 188 enters into the A-side mold cavity 104, pushing the molded part away from the A-side mold cavity so that it remains in the B-side mold cavity 104'. Importantly, when the mold is in the closed position, shown in FIG. 9, the ends 202 of the abutting pins 172 are flush with the composite surface 130 and in engagement with the composite surface 132. As the mold begins to open, the ends 202 follow the surface 132 and the eject edge 188 moves in precise correspondence with the movement of the B-side mold assembly 20 so that the molded part is held firmly within the B-side mold cavity 104'.

Figure 11:
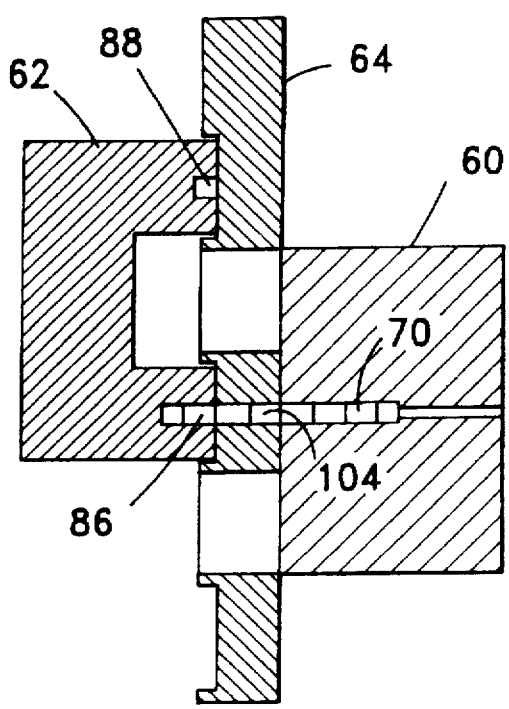
FIGS. 11 through 14 are schematic representations of the three mold bodies of FIG. 5 shown in various operating positions.
Figure 12:
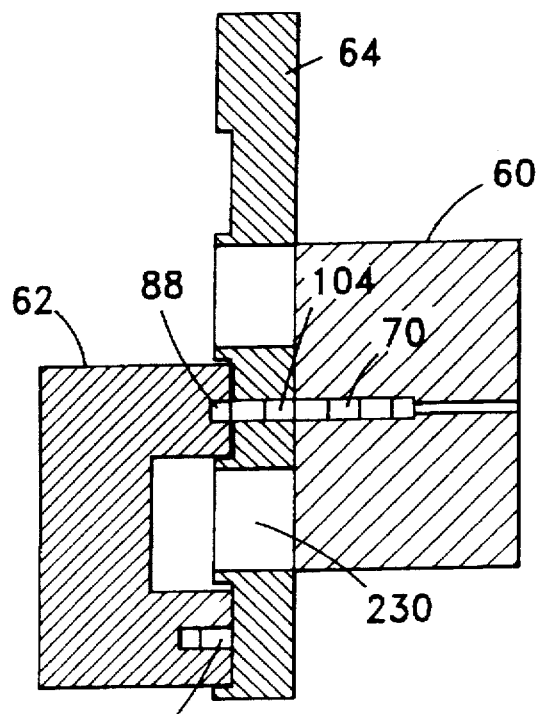
Figure 14:
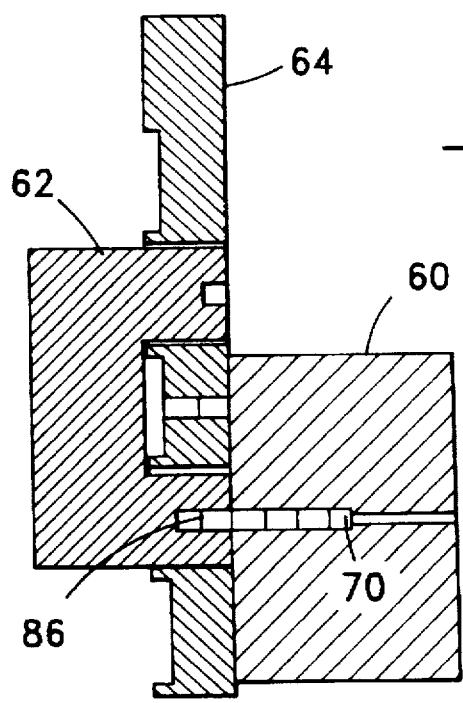
Figure 13:
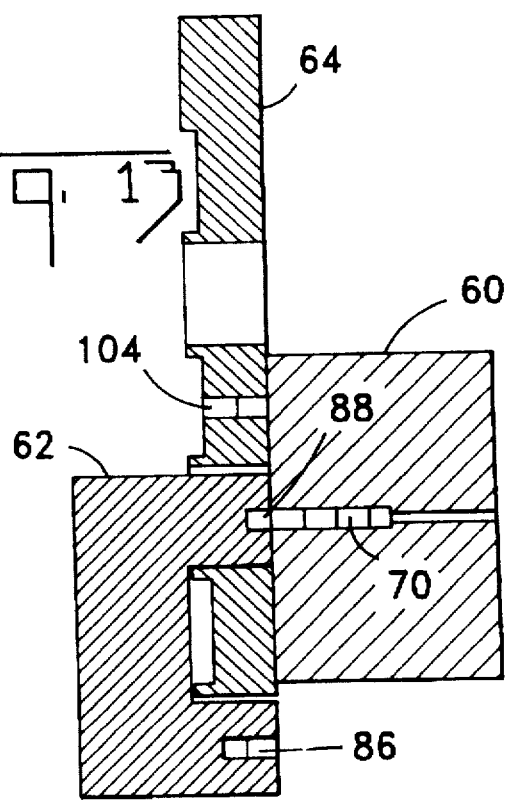

As shown in FIG. 11 the mold cavities 70, 104, and 86 are in mated engagement for molding a first part by operating the injection system 24. When it is desired to mold a second part utilizing the mold cavities 70, 104, and 88, the third mold body must be moved to the position shown in FIG. 12. This is done by first opening the mold by operating the toggle clamp 22 and then operating the first actuator 90 to move the third mold body 62 away from the second mold body 64. The second and third actuators 92 and 94 are operated to move the third mold body 62 downwardly, as viewed in FIG. 12, so that the mold cavity 88 is in proper alignment with the mold cavity 104. The first actuator 90 is then operated to move the third mold body 62 into mated engagement with the second mold body 64. The toggle clamp 22 is then operated to close the mold and the injection system 24 operated to inject molten plastic into the mated mold cavities. When it is desired to mold a third part utilizing the mold cavities 70 and 88, the third and second mold bodies 62 and 64 must be moved to the position shown in FIG. 13. This is done by first opening the mold by operating the toggle clamp 22 and then operating the first actuator 90 to move the third mold body 62 away from the second mold body 64. The fourth and fifth actuators 106 and 108 are operated to move the second mold body 64 to the left, as viewed in FIG. 12, out of engagement with the first mold body 60 and then the sixth and seventh actuators 110 and 112 are operated to move the second mold body upwardly so the opening 230, shown in FIG. 12, is in centered alignment with first mold cavity 70. The first actuator 90 is then operated to move the second mold body 64 to the right, as viewed in FIG. 13, and the third mold body 62 into mated engagement with the first mold body 60, to the position shown in FIG. 13, with the mold cavities 70 and 88 in mated engagement. When it is desired to mold a fourth part utilizing the mold cavities 70 and 86, the third mold body 62 must be moved to the position shown in FIG. 14. This is done by first opening the mold by operating the toggle clamp 22 and then operating the first actuator 90 to move the third mold body 62 away from the second mold body 64. The second and second actuators 92 and 94 are then operated to move the third mold body 62 upwardly, as viewed in FIG. 13 until the second mold cavity 86 is in alignment with the first mold cavity 70. The first actuator 90 is then operated to move the third mold body 62 into mated engagement with the first mold body 60, to the position shown in FIG. 14, with the mold cavities 70 and 86 in mated engagement for molding a fourth part.

As the second mold body 64 is moved laterally by the fourth and fifth actuators 106 and 108 and then moved longitudinally by the sixth and seventh actuators 110 and 112, the traveling separator assist mechanism 150 travels along with the A-side portion of the second mold body so that it is operable in any of the molding positions shown in FIGS. 11 through 14. While, in the present example, the mold cavity 104 is not used to mold a part as configured in FIGS. 13 and 14, hypothetically, there could be another mold cavity, not shown, adjacent the mold cavity 70 in the first mold body in alignment with the mold cavity 104. In such case the third mold body 62 would then be positioned with one of its mold cavities 86 and 88 in engagement with the mold cavity 104, in a manner similar to that shown in FIGS. 11 and 12 to mold a different part. Importantly, the traveling separator assist will travel with the A-side portion of the second mold body and be operable in various operating positions thereof. While the traveling separator assist, in the present example, is shown in the second mold body 64, it may be advantageously utilized in any movable mold body such as the first mold body 62 where the second and third mold cavities 86 and 88 require the assist function.

An important advantage of the present invention is that small complex parts, such as electrical connector housings, can be molded in a reconfigurable mold where separator assist elements are required to assure that the molded part is retained in the desired half of the mold when the mold is opened. The present separator assist elements are arranged in the movable mold bodies and travel therewith during reconfiguration so that they are operable in all operating positions of the movable mold bodies. The present traveling separator assist elements are relatively simple in structure and permit rapid and automated reconfiguration of the mold. This is very beneficial when making relatively small quantities of different parts because machine down time is essentially eliminated.

I claim:

1. Apparatus for selectively molding one of a plurality of different molded parts, comprising:

(a) a mold frame, an A-side frame coupled to said mold frame, and a B-side frame coupled to said mold frame;

(b) a first mold body having a first mold cavity therein, and a second mold body having a second mold cavity therein, said second mold body being selectably movable with respect to said first mold body to a first position where said second mold cavity is in communication with said first mold cavity and to a second position where said second mold cavity is spaced from said first mold cavity, both said first and second mold bodies being split along a part line so that each has a portion on one side of said part line coupled to said A-side frame and another portion on the other side of said part line coupled to said B-side frame, one of said A-side frame and B-side frame being a movable frame arranged to move in a direction toward said part line into a closed position wherein respective portions of said first and second mold bodies are in mutual mated engagement, and in an opposite direction away from said part line to an open position wherein said respective portions are separated; and (c) a traveling separator assist arranged in said A-side portion of said second mold body and operable to eject said molded part from said second mold cavity in said A-side portion only during movement of said movable frame to said open position, said traveling separator assist including a spring mechanism for effecting operation thereof when said second mold body is in both said first and second positions, wherein said molded part remains in said B-side portion thereof when said movable frame is moved from said closed position to said open position.

2. The molding apparatus according to claim 1 wherein said traveling separator assist includes an ejector member arranged to move within a first opening in said A-side portion of said second mold body in a first direction toward said B-side and in a second opposite direction away therefrom, said ejector member having an ejector edge for engaging and ejecting said molded part from said second mold cavity of said A-side portion of said second mold body when said traveling separator assist is operated by said spring mechanism.

3. The molding apparatus according to claim 2 wherein said ejector member is cylindrically shaped and said ejector edge is disposed on one end thereof, and wherein said spring mechanism is arranged to urge said ejector member in said first direction so that said edge enters into said second mold cavity during movement of said movable frame to said open position.

4. The molding apparatus according to claim 3 wherein said traveling separator assist includes a first elongated plate disposed in a conformal elongated opening in said A-side portion of said second mold body, said ejector member being held captive to said first plate, said first plate arranged to move within said elongated opening in said first and second directions so that said ejector member moves in said first and second directions within said first opening.

5. The molding apparatus according to claim 4 wherein said traveling separator assist includes first and second abutting pins arranged on opposite sides of said ejector member and held captive to said first plate, said first and second abutting pins extending through respective holes in said A-side portion of said second mold body past said part line toward said B-side movable portion of said second mold body when said movable frame is in said open position, said first and second abutting pins arranged to abuttingly engage said B-side portion of said second mold body during movement thereof to said closed position and thereby move said first plate and said ejector member in said second direction so that said ejector edge is withdrawn from said second mold cavity.

6. The molding apparatus according to claim 5 wherein said spring mechanism includes a resilient member and a second elongated plate rigidly attached to said A-side portion of said second mold body, said resilient member being disposed between said first and second elongated plates and arranged to urge said first elongated plate away from said second elongated plate so that during movement of said B-side portion of said second mold body from said closed position to said open position said ejector member is urged in said first direction, said ejector edge entering into said second mold cavity, engaging and ejecting said molded part from said A-side portion of said second mold cavity.

7. The molding apparatus according to claim 5 including a third elongated plate conformally received within said elongated opening and having a mating surface in engagement with said first elongated plate, said third elongated plate having respective holes through which said ejector member and said first and second abutting pins extend, including counterbores in said mating surface, one counterbore in alignment with each of said respective holes, wherein each of said ejector member and said first and second abutting pins includes an enlarged portion disposed within a respective counterbore between said first and third elongated plates.

8. The molding apparatus according to claim 7 wherein said first and third elongated plates are rigidly attached together, thereby trapping said enlarged portions within their respective counterbores.

9. The molding apparatus according to claim 1 wherein said A-side and B-side portions of said movable mold body are slidingly coupled to said A-side and B-side frames, respectively, for guiding said selective movement to said first and second positions.

10. The molding apparatus according to claim 1 wherein said traveling separator assist includes a first elongated plate disposed in a conformal elongated opening in said A-side portion of said second mold body, said elongated plate arranged to move in a first direction toward said B-side and in a second opposite direction away therefrom, an ejector member carried by said elongated plate having an ejector edge for engaging and ejecting said molded part from said second mold cavity of said A-side portion of said second mold body when said traveling separator assist is operated by said spring mechanism.

11. The molding apparatus according to claim 10 wherein said traveling separator assist includes first and second abutting pins arranged on opposite sides of said ejector member and held captive to said first plate, said first and second abutting pins extending through respective holes in said A-side portion of said second mold body past said part line toward said B-side movable portion of said second mold body when said movable frame is in said open position, said first a second abutting pins arranged to abuttingly engage said B-side portion of said second mold body during movement thereof to said closed position and thereby move said first plate and said ejector member in said second direction so that said ejector edge is withdrawn from said second mold cavity.

12. In an apparatus for selectively molding one of a plurality of different molded parts, including; a mold frame, an A-side frame coupled to said mold frame, and a B-side frame coupled to said mold frame; a first mold body having a first mold cavity therein, and a second mold body having a second mold cavity therein, said second mold body being selectably movable with respect to said first mold body to a first position where said second mold cavity is in communication with said first mold cavity and to a second position where said second mold cavity is spaced from said first mold cavity, both said first and second mold bodies being split along a part line so that each has a portion on one side of said part line coupled to said A-side frame and another portion on the other side of said part line coupled to said B-side frame, one of said A-side frame and B-side frame being a movable frame arranged to move in a direction toward said part line into a closed position wherein respective portions of said first and second mold bodies are in mutual mated engagement, and in an opposite direction away from said part line to an open position wherein said respective portions are separated, a traveling separator assist arranged in said A-side portion of said second mold body and operable to eject said molded part from said second mold cavity in said A-side portion only during movement of said movable frame to said open position, said traveling separator assist including a first elongated plate disposed in a conformal elongated opening in said A-side portion of said second mold body, said elongated plate arranged to move in a first direction toward said B-side under the urging of a resilient member and in a second opposite direction away therefrom, an ejector member carried by said elongated plate having an ejector edge for engaging and ejecting said molded part from said second mold cavity, wherein said molded part remains in said B-side portion thereof.

13. The apparatus according to claim 12 wherein said traveling separator assist includes a spring mechanism for effecting operation thereof upon said movable frame moving to its open position when said second mold body is in both said first and second positions.

* * * * *